(12) United States Patent
Hall

(10) Patent No.: US 6,509,412 B1
(45) Date of Patent: Jan. 21, 2003

(54) SOFT GEL COMPATIBILIZED POLYMER COMPOUND FOR HIGH TEMPERATURE USE

(75) Inventor: James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/676,352

(22) Filed: Sep. 29, 2000

(51) Int. Cl.[7] .......... C08L 23/02; C08L 53/02; C08L 71/12
(52) U.S. Cl. .......... 525/92 D; 525/68; 525/133; 524/504; 524/505; 524/508
(58) Field of Search .......... 525/92 D, 133, 525/68; 534/505, 504, 508

(56) References Cited

U.S. PATENT DOCUMENTS

| | | |
|---|---|---|
| 3,306,874 A | 2/1967 | Hay |
| 3,306,875 A | 2/1967 | Hay |
| 3,379,792 A | 4/1968 | Finholt |
| 3,383,435 A | 5/1968 | Cizek |
| 3,660,531 A | 5/1972 | Lauchlan et al. |
| 3,835,200 A | 9/1974 | Lee, Jr. |
| 3,920,770 A | 11/1975 | Nakashio et al. |
| 3,994,856 A | 11/1976 | Katchman et al. |
| 4,006,116 A | 2/1977 | Dominguez ............ 260/336 |
| 4,081,424 A | 3/1978 | Gergen et al. |
| 4,102,854 A | 7/1978 | Gergen et al. |
| 4,107,130 A | 8/1978 | Gergen et al. |
| 4,110,303 A | 8/1978 | Gergen et al. |
| 4,113,800 A | 9/1978 | Lee, Jr. |
| 4,122,131 A | 10/1978 | Bussink et al. ............ 260/873 |
| 4,145,377 A | 3/1979 | Bussink et al. |
| 4,166,055 A | 8/1979 | Lee, Jr. |
| 4,239,673 A | 12/1980 | Lee, Jr. |
| 4,256,853 A | 3/1981 | Naylor et al. |
| 4,383,082 A | 5/1983 | Lee, Jr. |
| 4,563,500 A | 1/1986 | Haaf et al. |
| 4,732,928 A | 3/1988 | Mizushiro et al. |
| 4,753,989 A | 6/1988 | Hudson, Jr. ............ 525/92 |
| 4,764,559 A | 8/1988 | Yamauchi et al. ............ 525/92 |
| 4,772,657 A | 9/1988 | Akiyama et al. |
| 6,045,883 A | 4/2000 | Akiyama et al. ............ 428/357 |
| 6,096,435 A | 8/2000 | Maekawa et al. ............ 428/462 |
| 6,184,292 B1 * | 2/2001 | Hall ............ 525/185 |

FOREIGN PATENT DOCUMENTS

| | | | |
|---|---|---|---|
| EP | 0 580 051 A | 7/1993 | ............ C08L/25/04 |
| EP | 1 029 876 A | 8/2000 | ............ C08F/297/04 |
| JP | 2000-109641 | * 4/2000 | |
| WO | WO 81/02020 | 7/1981 | |
| WO | WO 99/54402 | 10/1999 | ............ C08L/51/04 |
| WO | WO 01/09239 | 2/2001 | ............ C08L/53/02 |

* cited by examiner

*Primary Examiner*—Patricia A. Short
(74) *Attorney, Agent, or Firm*—Meredith Palmer; Scott McCollister

(57) ABSTRACT

A soft gel composition includes a hydrogenated block copolymer, a polyphenylene ether, substantially amorphous polyolefin or hydrogenated polydiene, and a compatibilizer blended in respective proportions sufficient to provide the composition with a Shore A hardness of no more than about 30 and a service temperature of up to about 150° C.

20 Claims, No Drawings

SOFT GEL COMPATIBILIZED POLYMER COMPOUND FOR HIGH TEMPERATURE USE

FIELD OF THE INVENTION

The present invention relates to the use of a compatibilizer to produce hydrogenated block copolymer containing gel compositions superior in high-temperature (100° C.) compression set, mechanical strength and moldability, having utility at temperatures up to 150° C. and being useful as a molding material for various molded products.

BACKGROUND OF THE INVENTION

Thermoplastic elastomers of a rubberlike soft material, requiring no vulcanization, and having moldability like thermoplastic resins are highly desirable, especially for automobile parts, household electric appliance parts, electric wire-protecting materials, coatings, medical appliance parts, miscellaneous goods, footwear, and the like. Various elastomer compositions containing the hydrogenated product of vinyl-substituted aromatic hydrocarbon/conjugated diene block copolymers (hereinafter referred to as hydrogenated block copolymer) have been used in thermoplastic elastomeric applications.

Gels containing block copolymers, polyphenylene ether (PPO), and at least 500 parts by weight of an extender oil per 100 parts by weight (pbw) of block copolymer are known but generally are too soft, have insufficient tensile strength, and have a compression set that is less than desirable.

Also known are high-impact polyphenylene compositions that include a PPO resin, a hydrogenated block copolymer, and an oil. These can provide thermoplastic resins having good processability, but have not been shown to provide thermoplastic elastomers having superior compression set at 100° C.

Combinations of PPO, hydrogenated styrene/butadiene/styrene block copolymer (SEBS), and a non-aromatic oil also are known. One such combination includes 100 pbw SEBS per hundred parts by weight of rubber (hereinafter phr) and from about 10 to 30 phr non-aromatic oil, has a weight ratio of SEBS/PPO of from about 90:1 to about 30:70, and has a compression set at 100° C. of less than 65%.

Previously available hydrogenated block copolymer-based thermoplastic elastomers exhibiting a high-temperature (100° C.) compression set of at least 65% do not reach the required level of high-temperature compression set for vulcanized rubber applications. Consequently, to obtain hydrogenated block copolymer-based thermoplastic elastomer compositions that can be molded repeatedly without losing their excellent high-temperature (100° C.) compression set often requires the use of a fourth ingredient such as a polyolefin or polystyrene. In some instances, a curative such as a peroxide, also has been added.

The use of low molecular weight oils to obtain soft gels, often results in oil exuding to the surface of a molded part formed from such gels, resulting in potential contamination of the immediate area and increasing the hardness of the part. Furthermore, oils are readily extractable from a molded part containing oil when that part is contacted with cleaning fluids or aqueous solutions containing solvents or surfactants, thereby limiting the areas where such parts can be used. Attempts to form non-oil polymeric compositions of SEPS/PPO matrices by bulk mixing have suffered from poor compatibilization. Therefore, an extra step of dissolving the components in solvent prior to mixing is often required. This step increases both the cost and time required to form the desired polymer compositions.

Accordingly, a strong need remains for thermoplastic elastomer compositions that can be processed easily and used repeatedly but which are superior in high-temperature (100° C.) compression set and can be obtained in a simple manner, preferably using bulk mixing equipment.

SUMMARY OF THE INVENTION

The present invention provides a composition of hydrogenated block copolymer, such as hydrogenated SEBS; PPO; amorphous polyolefin; and compatibilizer blended in bulk proportions specifically selected with respective weight proportions sufficient to provide a soft gel having a service temperature of up to about 150° C. and a Shore A hardness of no more than about 30. In an exemplary embodiment, a composition having a compression set at 100° C. for 22 hours of less than 65% that includes 100 pbw of a hydrogenated polymer, 10 to 150 pbw of a homo- and/or co-polymeric PPO resin, 10 to 500 pbw of a substantially amorphous polyolefin or hydrogenated polydiene, and 5 to 75 pbw of a diblock polymer including a first block that includes units derived from a vinyl-substituted aromatic hydrocarbon and a second block that includes units derived from a conjugated diene is provided. The diblock polymer acts to compatibilize the other components. The hydrogenated polymer includes at least two polymer blocks derived from a vinyl-substituted aromatic hydrocarbon and at least one polymer block derived from a conjugated diene. The PPO resin includes a binding unit of the general formula:

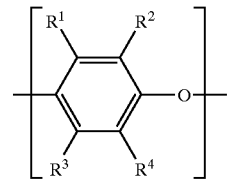

wherein $R^1$, $R^2$, $R^3$, and $R^4$ independently are a hydrogen atom, a halogen atom, and/or a hydrocarbon group. The compositions have damping properties useful in producing molded products having heat resistance and high elasticity.

One advantage of the present polymer composition is that compression set values of less than about 65% may be consistently achieved when the non oil (low oil) blend is mixed in bulk mixing equipment. This eliminates the step of dissolving the components in a common solvent.

DETAILED DESCRIPTION OF ILLUSTRATIVE EMBODIMENTS

The present invention provides a hydrogenated block copolymer composition having a compression set at 100° C. of 65% or less which comprises:

a) 100 parts by weight of a hydrogenated block copolymer obtained by hydrogenating a block copolymer comprising at least two polymer blocks A composed mainly of a vinyl-substituted aromatic hydrocarbon and at least one polymer block B composed mainly of a conjugated diene, b) 10 to 150 parts by weight of a homopolymeric and/or copolymeric polyphenylene ether resin comprising a binding unit represented by the general formula:

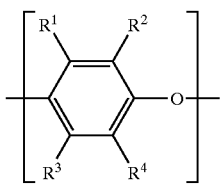

wherein $R^1$, $R^2$, $R^3$, and $R^4$, which may be the same or different, represent substituents selected from one or more of hydrogen, halogen, hydrocarbon groups and substituted hydrocarbon groups, c) 10 to 500 parts by weight of a substantially amorphous polyolefin such as EPR or a hydrogenated polydiene, and d) 5 to 75 parts by weight of a compatibilizer in the form of a vinyl-substituted aromatic hydrocarbon/conjugated diene diblock polymer.

The hydrogenated block copolymer is obtained by hydrogenating a block copolymer comprising at least two polymer blocks A composed mainly of a vinyl-substituted aromatic hydrocarbon and at least one polymer block B composed mainly of a conjugated diene. This hydrogenated block copolymer has the polymer structure of hydrogenated products of vinyl-substituted aromatic hydrocarbon/conjugated diene block copolymers represented by formulae such as: $(AB)_nA$, $(BAB)_nA$, $(BAB)_nAB$, $(AB)_mX$, etc., wherein n is an integer of 1 or more, m is an integer of 2 or more and X represents a coupling or polyfunctional initiator residue having two or more functional groups.

This hydrogenated block copolymer contains 5 to 60 wt. %, preferably 10 to 50 wt. % of a vinyl-substituted aromatic hydrocarbon. Referring now to its block structure, the polymer block A composed mainly of vinyl-substituted aromatic hydrocarbon has the structure of the homopolymer block of a vinyl-substituted aromatic hydrocarbon containing more than 50 wt. %, preferably not less than 70 wt. % of vinyl-substituted aromatic hydrocarbon with a hydrogenated conjugated diene. The polymer block B composed mainly of a hydrogenated conjugated diene has the structure of the homopolymer block of a hydrogenated conjugated diene or the copolymer block of a hydrogenated conjugated diene containing more than 50 wt. %, preferably not less than 70 wt. % of hydrogenated conjugated diene with a vinyl-substituted aromatic hydrocarbon. Both polymer blocks may take any of random, tapered and partial block arrangements and combinations thereof; and when the numbers of both of the polymer blocks A and B are 2 or more, the structures of the respective polymer blocks may be the same or different.

The vinyl-substituted aromatic hydrocarbon contributed monomer units are one or more of styrene, α-methylstyrene, 1-vinyl naphthalene, 2-vinyl naphthalene, 1-α-methylvinyl naphthalene, 2-α-methylvinyl naphthalene, vinyltoluene, as well as alkyl, cycloalkyl, aryl, alkaryl, and alkyl derivatives thereof, in which the total number of carbon atoms in the combined hydrobarbon is not greater than 15, as well as any di- or tri-vinyl aromatic hydrocarbons. vinyltoluene, and the like. Of these compounds, styrene is preferred.

Conjugated diene contributed monomer units are one or more of butadiene, isoprene, 1,3-pentadiene, and 2,3-dimethyl-1,3-butadiene. Butadiene and/or isoprene, are preferred. The polymer block composed mainly of a conjugated diene before hydrogenation may contain any amount, expressed by mole %, of the conjugated diene microstructure, and, for example, a polybutadiene block contains 5 to 90 mole %, preferably 10 to 50 mole percent of the 1,2 vinyl bond.

The hydrogenated block copolymer of the above structure used in the present invention has a number average molecular weight (Mn) in a range of from about 100,000 to 1,000,000, preferably from 125,000 to 800,000, more preferably 150,000 to 500,000 and the molecular weight distribution ratio (Mw/Mn) of weight average molecular weight (Mw) to number average molecular weight is 10 or less. The molecular structure type of the hydrogenated block copolymer may be any of straight chain, branched involving partial coupling with a coupling agent, radial, and/or the star-shaped types.

There is no limitation to a method for producing these hydrogenated block copolymers, so far as they have the structure described above. These copolymers can be obtained by synthesizing a vinyl-substituted aromatic hydrocarbon/conjugated diene block copolymer in an inert solvent using an organolithium anionic initiatior, and, if necessary, a 1,2-vinyl bond modifier such as ether compounds, tertiary amines, etc. according to the methods known in the art, and then hydrogenating the resulting block copolymer according to the well-known methods. Exemplary vinyl modifiers include one or more of hexamethylphosphoric acid triamide, N,N,N',N'-tetramethylethylene idamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxolanyl propane, tri-n-propyl amine, trimethyl amine, triethyl amine, N,N-dimethyl aniline, N-ethylpiperidine, N-methyl-N-ethyl aniline, and N-methylmorpholine.

For example, the polymer block composed mainly of the conjugated diene can be changed in form to the polymer block of an olefinic compound by hydrogenating at least 80 mole % of the aliphatic double bond coming from the conjugated diene of the vinyl-substituted aromatic hydrocarbon/conjugated diene block copolymer.

Also, there is no particular limitation to the hydrogenation ratio of the aromatic double bond coming from the polymer block A composed mainly of the vinyl-substituted aromatic hydrocarbon and the vinyl-substituted aromatic hydrocarbon which has been incorporated as a comonomer, as need arises, in the polymer block B composed mainly of the conjugated diene, but the hydrogenation ratio is preferably 20 mole % or less. The amount of unhydrogenated aliphatic double bonds contained in the hydrogenated block copolymer can easily be determined by IR spectroscopy, NMR, etc.

PPO improves the high-temperature (100° C.) compression set. This resin is a homopolymer and/or copolymer comprising a binding unit represented by the general formula

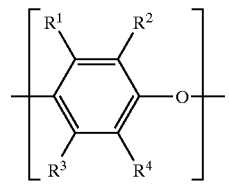

wherein $R^1$, $R^2$, $R^3$, and $R^4$, which may be the same or different, represent substituents selected from the group consisting of hydrogen, halogen, hydrocarbon groups and substituted hydrocarbon groups. Well-known polyphenylene ether resins (PPO) include poly(2,6-dimethyl 1,4-phenylene ether), poly(2-methyl-6-ethyl-1,4-phenylene ether), poly(2,6-diphenyl-1,4-phenylene ether), poly(2-methyl-6-phenyl-1,4-phenylene ether), poly(2,6-dichloro-1,4-phenylene ether), and the like. Furthermore, copolymers of 2,6-dimethylphenol with other phenols (e.g. 2,3,6-trimethylphenol, and 2-methyl-6-butylphenol) may be used. Of these polymers, poly(2,6-dimethyl-1,4-phenylene ether) is preferable.

The amount of the polyphenylene ether, blended, is preferably in the range about 10 to 150 parts by weight based on 100 parts by weight of the hydrogenated block copolymer. When the amount exceeds 150 parts by weight, the hardness of hydrogenated block copolymer compositions obtained is too high, so that the compositions lose flexibility and become resinous. When the amount is less than 10 parts by weight, no improvement in high-temperature compression set due to the addition of the polyphenylene ether resin can be observed.

Modified PPO is also contemplated in the invention. It is formed by modifying the above-mentioned PPO by the use of a modifier. As the modifier used for modifying the PPO, there is used a compound having an ethylenic double bond and a polar group in the same molecule, which is specifically exemplified by maleic anhydride, maleic acid, maleic acid ester, maleimide, N-substituted compounds thereof, acrylic acid, acrylic acid ester, methacrylic acid, methacrylic acid ester, and glycidyl methacrylate, among which maleic anhydride is preferred.

The use of a substantially amorphous polyolefin such as EPR or hydrogenated polydienes as component (c), helps to obtain soft and rubberlike compositions. EPR useful in the blends of this invention are substantially amorphous having crystallinity of less than 10% by weight. The EPR is formed from copolymerized monomers of ethylene, olefins, e.g., propylene, and, optionally, known vinyl modifiers, e.g., 1,4 hexadiene and 5 ethylidene, and 2-norbornene. The Mw of these EPR polymers (using styrene constants) typically ranges from about 5,000 to about 60,000. EPR can be prepared by procedures known in the art, and certain polymers are available commercially from, for example, Aldrich Chemical Co. (Milwaukee, Wis.) and Uniroyal Chemical Co. (Akron, Ohio).

Suitable hydrogenated polydienes include but are not limited to hydrogenated polyisoprene and hydrogenated vinyl polybutadiene, however, any polymerized hydrogenated conjugated diene having a Mw (using styrene constants) from about 5,000 to about 60,000 is suitable for use in the present invention.

These olefinic polymers, copolymers, terpolymers, tetrapolymers, etc., are readily prepared using soluble Ziegler-Natta catalyst compositions. Suitable polyolefins may be prepared in either batch or continuous reactor systems, in gas phase, solution or slurry polymerizations. In particular, effective use can be made of a tubular reactor system to achieve novel molecular composition and molecular weight distribution. In common with all Ziegler-Natta polymerizations, monomers, solvents, and catalyst components, are dried and freed from moisture, oxygen, or other constituents which are known to be harmful to the activity of the catalyst system. Feed tanks, lines and reactors may be protected by blanketing with an inert dry gas such as purified $N_2$. Chain propagation retarders or stoppers, such as $H_2$ and anhydrous HCl, may be fed continuously or intermittently, to any but a tubular reactor, for the purpose of controlling the molecular weight and/or molecular weight distribution within the desired limits. Additionally, as described above, it is known to incorporate branch suppressors such as certain Lewis Bases, e.g., $NH_3$, and certain silicates, during the EPDM polymerization to reduce branching.

The amount of EPR is 10 to 500 pbw, preferably 100 to 400 pbw, based on 100 pbw of the hydrogenated block copolymer. If the amount of EPR is less than 10 pbw, the resulting product becomes resin-like, increases its hardness, and loses its flexibility. Additionally, the product itself can be considered not to be economical due to a small quantity in the use of cheap softening agent. If EPR is blended in a range of 10 to 400 pbw, a composition superior in the high-temperature (100° C.) compression set can be obtained.

The compatibilizer may serve to eliminate any difficulty ascribed to obtaining a homogeneous mixture of the non-oil polymeric softener with the hydrogenated block copolymer and PPO blend. With the use of the compatibilizer the process may be conducted on a larger scale than had previously been allowed. The compatibilizer allows the polymer to obtain a desired degree of dispersion with reduced gross separation of components. The gels used in conjunction with the compatibilizer consistently obtain compression set values less than 65% in bulk quantities.

Optionally, a grafting agent with at least 2 organic functional groups, such as a peroxide can be added during the blending of the above-described components. The grafting agent generally is added in amounts ranging from 1 to 5 pbw based on 100 pbw of the hydrogenated block copolymer and further promotes the process of obtaining a thorough mixture. Peroxides graft the components of the mixture together, further reducing the immiscibility, promoting adhesion, and reducing the interfacial tension of the components allowing for the generation of a thoroughly homogeneous mixture. All components of the blend of the present invention are susceptible to attach by the free radicals generated by the grafting agents. Peroxide grafting agents that are stable at 25° C. are particularly useful, such as di-t-butyl peroxide.

Suitable compatibilizers are vinyl-substituted aromatic hydrocarbon/conjugated diene diblock polymers. The diblock polymer contains 5 to 50% by weight of vinyl-substituted aromatic hydrocarbon contributed monomers and 95 to 50% by weight of conjugated diene contributed monomers. Particularly useful monomers for this purpose are vinyl-aryl and methylvinyl-aryl compounds such as styrene, methylstyrene, vinyl toluene, vinyl naphthalene, methylvinyl toluene, vinyl diphenyl, and corresponding compounds in which the aromatic nucleus may have other alkyl derivatives up to a total of 8 carbon atoms. Commonly utilized conjugated diolefin monomers include isoprene, 1,3-butadiene, 2,3-dimethyl-1,3-butadiene, piperylene, 3-butyl-1,3-octadiene, and/or 2-phenyl-1,3-butadiene. In a preferred embodiment, the diblock is a butadiene/styrene diblock polymer. The Mw of the diblock polymer is preferably in the range from about 25,000 to about 200,000.

Frequently, other additives known in the art can be added to the composition of the present invention. Stabilizers, antioxidants, conventional fillers, reinforcing agents, reinforcing resins, pigments, fragrances and the like are examples of some such additives. Useful antioxidants and stabilizers include 2,2-hydroxy-5-methylphenyl, benzotriazole, nickel dibutyidithiocarbamate, zinc dibutyl dithiocarbamate, tris(nonylphenyl) phosphite, and 2,6-dibutyl-4-methylphenol. Examples of granular or powdery filler include talc, carbon black, graphite, titanium oxide, silica, mica, calcium carbonate, calcium sulfate, barium carbonate, magnesium carbonate, magnesium sulfate, barium sulfate, tin oxide, alumina, kaolin, silicon carbide, metallic powder, glass powder, glass flake and glass bead. These compounding ingredients are incorporated in suitable amounts depending upon the contemplated use of the product, preferably in the range of 1 to 350 pbw of additives or compounding ingredients per 100 pbw of soft gel.

A reinforcement may be defined as the material that is added to a resinous matrix to improve the strength of the soft gel. Most of these reinforcing materials are inorganic or organic products of high molecular weight. Various examples include glass fibers, asbestos, boron fibers, carbon, and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability. Examples of other elastomers and resins include adhesive-like products such as Reostomer (Riken-Vinyl Inc.), hydrogenated polystyrene—(medium or high) 3,4-polyisopene-polystyrene block copolymers such as Hybler (produced by Kurare Inc.), polynorbornenes such as Norsorex (produced by Nippon Zion Inc.) and the like.

The above-mentioned filler is preferably surface treated. The coupling agent to be used for the surface treatment is to improve adhesion between the filler and composition, and may be optionally selected for use from the well-known silane-based coupling agents and titanium-based coupling agents. Examples of preferably usable coupling agents among them include aminosilane such as di-aminopropyltrimethoxysilane, N-bis-(aminoethyl) diaminopropyltrimethoxysilane, glycidoxypropyltrimethoxysilane and bis-(3,4-epoxycyclohexyl) ethyltrimethoxysilane, epoxysilane, isopropyltriaminoethyl titanate, and the like.

A second softening agent may be added to further decrease the hardness of the composition. Paraffin oil or similar non-aromatic oil can be added at a level of no more than 25 pbw per 100 pbw of soft gel.

Soft gels generally have low to high damping properties having a tan 67 in the range of about 0.1 to about 1.0, and a Shore A hardness ranging from 0 to about 50, preferably about 1 to about 30, most preferably about 5 to 20 at about 20 to 25° C. or at room temperature. The service temperature of the soft gels of the present invention is less than or equal to 150° C. for most of the blends of polymers of the present invention, e.g., 100° C. compression set of the soft gel is less than 65% while the 70° C. compression set is less than 50% and preferably less than 30%.

Soft gel compositions may be prepared by any means well known in the art for combining such ingredients, such as solution blending, milling, internal batch mixing, or continuous extrusion of a solid form of the soft gel compositions and the other ingredients. A rapid and convenient method of preparation comprises heating a mixture of the components to a temperature of about 50 to about 290° C. preferably holding the composition above its melting point for a few minutes up to several hours, e.g. 15–60 minutes. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as $N_2$ or $CO_2$, is also preferable.

The composition obtained using the manufacturing method of this invention can be molded with equipment conventionally used for molding thermoplastics and is suitable for extrusion molding, calendar molding, and particularly injection molding. These compositions can also be solution mixed in appropriate solvent, e.g. cyclohexane or toluene.

The compositions of the present invention are favorably used in the manufacturing of any product in which the following properties are advantageous: a high degree of softness, heat resistance, decent mechanical properties, and elasticity. The compositions of the present invention can be used in all industry fields, in particular, in the fabrication of automotive parts, household electrical appliances, industrial machinery, precision instruments, transport machinery, constructions, engineering, and medical instruments. Since the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

In the following, the present invention will be described in more detail with reference to non-limitative examples. The following example is presented for purposes of illustration only and should not be construed in a limiting sense.

EXAMPLE

A polymer was prepared by combining at a temperature of 190° C. a charge comprised of 21 g Xyron X0101 (Asahi Chemical Industry Co., Ltd.: Tokyo, Japan) composed of 70% by weight of poly(2,6-dimethyl-1,4-phenylene ether) (PPO) and 30% by weight of high impact polystyrene (PS) with 14 grams of a butadiene/styrene diblock (33% by weight styrene, Mn=54,600) at 90 rpm for 10 minutes. A further charge of 14 grams of isotactic polypropylene filler (iPP)(Aldrich) was added and mixed for 5 minutes at 90 rpm. The resultant plastic material was removed and cut into 0.50 cm pieces while hot.

At 190° C., 70 parts by weight of the plastic material prepared above was mixed with 100 parts by weight of hydrogenated medium vinyl SEBS (Kuraray Co.; Tokyo, Japan, #S8006, MW=215,000, 33% by weight styrene) and 190 parts by weight of EPR (Aldrich) MW=21,300 (polystyrene standards) and a Tg of −33° C. at 60–90 rpm. The copolymer was added to the mixture in five increments over the course of 30 to 45 minutes. At a temperature less than 50° C., 0.6 to 1.0 parts by weight of di-t-butyl peroxide (Aldrich) was mixed with the blended product produced above at 30 rpm as the compound is heated to 190° C. over 20 minutes. The resultant compound was maintained at 190° C. for 10 minutes and then cooled. Following cooling, the compound was molded at 200° C. for 5 minutes resulting in a compound displaying a Shore A of 24, Asker C of 52, and a Compression Set (C.S.) @ 100° C. of 43%.

I claim:

1. A composition having a compression set at 100° C. for 22 hours of less than 65%, comprising:

a) 100 parts by weight of a hydrogenated polymer comprising at least two vinyl-substituted aromatic hydrocarbon polymer blocks and at least one conjugated diene polymer block, b) 10 to 150 parts by weight of at least one of a homo- or co-polymeric polyphenylene ether resin comprising a binding unit represented by the general formula,

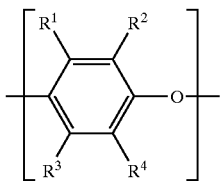

wherein $R^1$, $R^2$, $R^3$, and $R^4$, independently are a hydrogen atom, a halogen atom and/or a hydrocarbon group, c) 10 to 500 parts by weight of a substantially amorphous polyolefin or hydrogenated polydiene, and d) 5 to 75 parts by weight of a diblock polymer comprising a first block comprising vinyl-substituted aromatic hydrocarbon monomer units and a second block comprising conjugated diene monomer units, and wherein said diblock polymer comprises between about 5 to 50 percent by weight vinyl-substituted aromatic hydrocarbon monomer units.

2. The composition of claim 1 wherein said hydrogenated polymer comprises two or more polymer blocks comprising a conjugated diene, wherein at least one block is at the end of the polymer chain.

3. The composition of claim 1 wherein said hydrogenated polymer comprises 10 to 50 wt. % of the vinyl-substituted aromatic hydrocarbon, and has the unsaturation of the polymer block derived from the conjugated diene reduced after hydrogenation to 20 mole % or less of that of the unsaturation of said polymer block before hydrogenation.

4. The composition of claim 1 wherein said hydrogenated polymer has a structure of $(AB)_mX$ wherein X represents a coupling agent having two or more functional groups or a polyfunctional initiator residue, m represents an integer of at least 2, A represents a polymer block comprising vinyl-substituted aromatic hydrocarbon monomer units, and B represents a polymer block comprising conjugated diene monomer units.

5. The composition of claim 1 wherein said conjugated diene in said hydrogenated polymer is one or more of butadiene and isoprene.

6. The composition of claim 1 wherein said vinyl-substituted aromatic hydrocarbon in said hydrogenated polymer comprises styrene.

7. The composition of claim 1 wherein said hydrogenated polymer has a Mn of about 100,000 to about 500,000.

8. The composition of claim 1 wherein said polymer block derived from a conjugated diene in said hydrogenated polymer comprises 25 to 65 mole % of 1,2-vinyl bond.

9. The composition of claim 1 wherein said polyphenylene ether resin comprises at least one of poly(2,6-dimiethyl-1,4-phenylene) ether and a copolymer of 2,6-dimethylphenol with 2,3,6-trimethylphenol.

10. The composition of claim 1 wherein said substantially amorphous polyolefin has a crystallinity of less than about 10% by weight.

11. The composition of claim 1 wherein said substantially amorphous polyolefin comprises units derived from ethylene and one or more olefins.

12. The composition of claim 1 further comprising a grafting agent.

13. The composition of claim 1 wherein said diblock copolymer comprises monomer units derived from styrene and butadiene.

14. The composition of claim 1 further comprising at least one of inorganic fillers, flame retardants, glass fibers, carbon fibers, antioxidants, ultraviolet absorbers, hindered amine-type light stabilizers, electroconductive fillers, reinforcing resins, paraffinic oils, and coloring agents.

15. A composition having a compression set at 100° C. for 22 hours of 65% or less as rubber, comprising:

a) a hydrogenated polymer comprising at least two vinyl-substituted aromatic hydrocarbon polymer blocks and at least one conjugated diene polymer block, b) of at least one of a homo- and co-polymeric polyphenylene ether resin, c) a substantially amorphous polyolefin or hydrogenated polydiene having a weight average molecular weight using polystyrene standards in the range of from about 5,000 to about 60,000, and d) a diblock polymer comprising a first block comprising vinyl-substituted aromatic hydrocarbon units and a second block comprising conjugated diene units, said diblock polymer comprising between about 5 to 50 percent by weight vinyl-substituted aromatic hydrocarbon units, and said diblock polymer acting to compatibilize components (a), (b), and (c).

16. The composition of claim 15 wherein said substantially amorphous polyolefin comprises units derived from ethylene and one or more olefins.

17. The composition of claim 15 wherein the hydrogenated polymer is a hydrogenated styrene/butadiene/styrene block copolymer.

18. The composition of claim 15 wherein, said polyphenylene ether resin comprises at least one of poly(2,6-dimethyl- 1,4-phenylene) ether and copolymer of 2,6-dimethylphenol with 2,3,6-trimethylphenol).

19. A method for forming a soft gel composition comprising blending sufficient amounts of hydrogenated block copolymer, a polyphenylene ether, and a substantially amorphous polyolefin having a weight average molecular weight in the range between 5,000 and 60,000, and a diblock polymer compatibilizer comprising a first block comprising vinyl-substituted aromatic hydrocarbon monomer units and a second block comprising conjugated diene monomer units so as to provide said composition with a Shore A hardness of 30 or less and a service temperature of up to about 150° C., and wherein said diblock polymer comprises between about 5 to 50 percent by weight vinyl-substituted aromatic hydrocarbon monomer units.

20. The method of claim 19 further comprising the inclusion of a grafting agent during said blending.

* * * * *